United States Patent [19] [11] 3,712,137
Zavod [45] Jan. 23, 1973

[54] WATER LEVEL INDICATOR
[75] Inventor: Pierce H. Zavod, King of Prussia, Pa.
[73] Assignee: The United States of America as represented by the Secretary of the Navy
[22] Filed: April 23, 1971
[21] Appl. No.: 136,920

[52] U.S. Cl. ............... 73/295, 116/118 R, 137/81.5
[51] Int. Cl. ........................ G01f 23/14, G01f 23/22
[58] Field of Search ........ 73/295; 137/81.5; 116/70, 116/118 R

[56] References Cited

UNITED STATES PATENTS

| | | | |
|---|---|---|---|
| 3,031,887 | 5/1962 | Weisend | 73/295 |
| 3,314,294 | 4/1967 | Colston | 137/81.5 X |
| 3,382,883 | 5/1968 | Laakaniemi et al. | 137/81.5 |
| 3,371,534 | 3/1968 | Akeley | 73/299 |

Primary Examiner—Louis R. Prince
Assistant Examiner—Daniel M. Yasich
Attorney—R. S. Sciascia and A. W. Collins

[57] ABSTRACT

Subject disclosure relates to novel and improved apparatus for continuously indicating the liquid level of a material in a heated pressurized vessel. The improved apparatus includes a tube, a portion of which passes through the liquid phase of the material, a pressurized fluid source connected to one end of the tube and means including a fluidic amplifier and a pressure drop transmitter connected to the other end of the tube for converting variations in pressure in the tube into a measure of liquid level in the vessel. A second tube, a portion of which passes through the vapor phase of the material is also connected between the pressurized fluid source and the fluidic amplifier and pressure drop transmitter to null liquid level measurement errors produced by changes in pressure of the material in the vessel.

8 Claims, 1 Drawing Figure

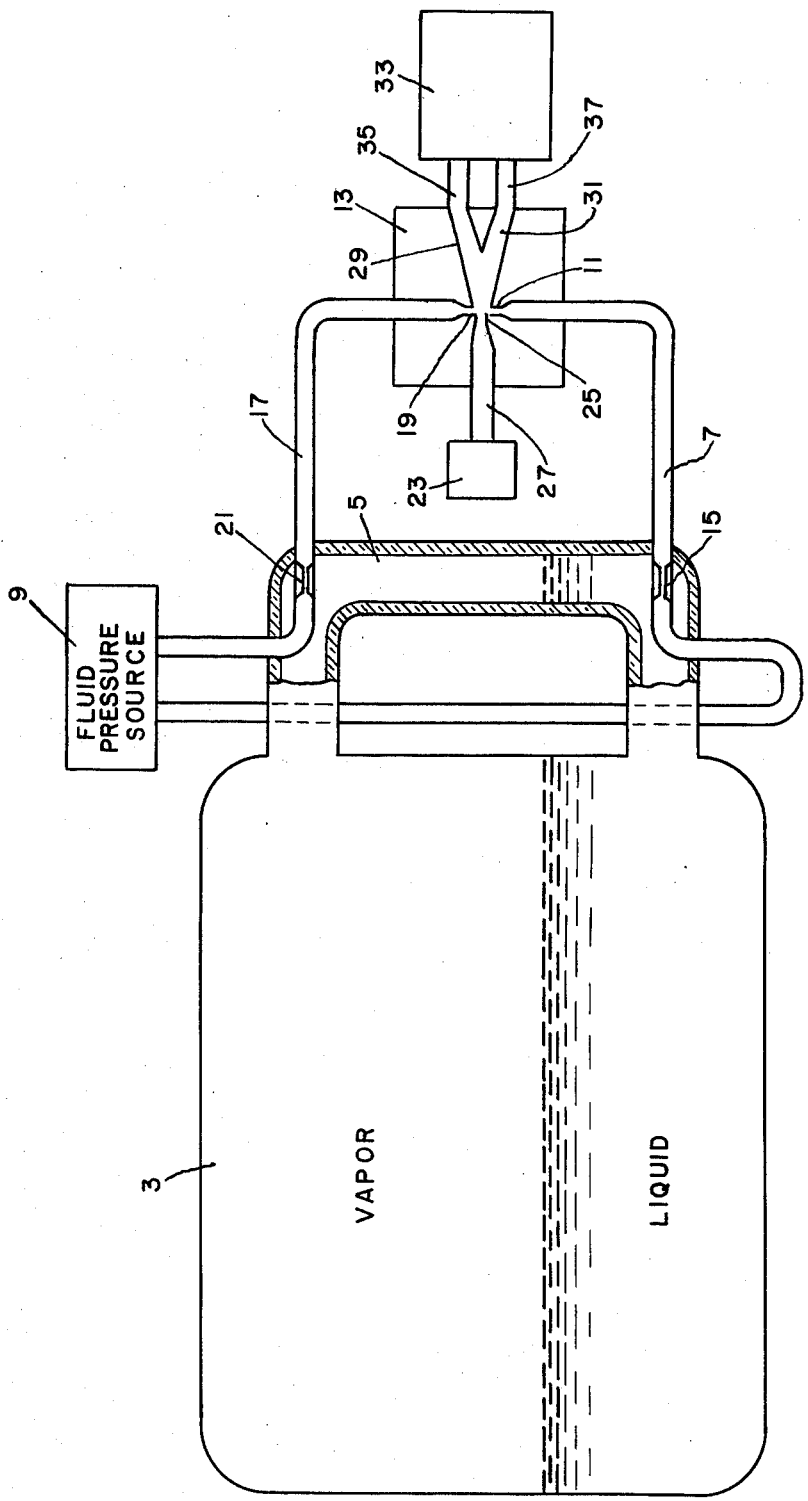

WATER LEVEL INDICATOR

The invention described herein may be manufactured and used by or for the Government of the United States of America for governmental purposes without the payment of any royalties thereon or therefor.

Various types of devices and apparatus have been used in the past to provide an air pressure signal that is reliable indicator of the level of a material in a pressurized vessel. Apparatus heretofore required to generate this type of signal, however, has involved heavy complex bulky equipment when a small change in the liquid level is to be accurately detected. Moreover, such apparatus included moving parts which were subject to misalignment and maladjustment and therefore particularly subject to failure due to high shock and/or vibrations.

It is therefore a principal object of the invention to provide novel and improved liquid level measuring apparatus for a material in a heated pressurized vessel.

It is a further object of the invention to provide novel and improved liquid level measuring apparatus which is simple and inexpensive in construction, which involves no moving parts that are sensitive to shock or vibration and which provides an accurate, reliable liquid level reading.

The single FIGURE of the drawing is a diagrammatic view of a preferred embodiment of the invention.

Referring now to the drawing, it will be noted that the boiler or other suitable vapor generating vessel 3 contains a material such as water which is heated and pressurized so as to provide a liquid and a vapor phase therein. The tube or fluid conduit 5 is preferably connected at one end of the vessel 3 and provides an open passageway between the upper vaporous area of the vessel 3 and its lower liquid filled area. The reduced diameter tube or conduit 7, which passes through the lower liquid phase portion of the tube 5, connects the air or other fluid pressure source 9 to the control nozzle 11 of the analog fluidic amplifier 13. The fluid restricting device 15, which is preferably positioned in the portion of the tube 7 that passes through the liquid phase portion of tube 7, is designed to minimize fluid flow through tube 7 without being so small as to permit impurities from the fluid source to interfere or block flow therethrough. For reasons which will be more apparent hereinafter, the fluid restricting device 15 is also designed to improve the sensitivity of the liquid level measuring system by limiting the pressure drop across the device 15 compared to the pressure variations in tube 7 as the liquid in tube 5 rises and falls in vessel 3. The fluid restricting device 15 is also designed such that pressure variations in tube 7 are maintained within the linear operative range of the fluidic amplifier 13. The fluid or air pressure source 9 is a constant pressure fluid source which is also designed in conjunction with the fluid restricting device 15 to permit pressure variations in tube 7 that may be linearly amplified in the amplifier 13.

The reduced diameter tube or conduit 17, which passes through the upper vapor phase portion of the tube 5 connects the air or fluid pressure source 9 to the control nozzle 19 of the analog fluidic amplifier 13. The fluid restricting device 21, which is preferably positioned in the portion of the tube 17 that passes through the vaporous portion of tube 5, is preferably designed in a manner similar to that of fluid restricting device 15. The constant high pressure fluid supply source 23 is connected to the power nozzle 25 of the fluidic amplifier 13 through conduit 27. The output passages 29 and 31 of the fluidic amplifier 13 are connected to any suitable conventional differential pressure measuring device 33 such as a pressure drop transmitter through conduits 35 and 37.

In operation, when the vessel 3 is subjected to saturation temperature and pressure and the level of the liquid material in the vessel is below the point where the tube 7 passes through the lower portion of the tube 5, tubes 7 and 17 are both exposed to the same temperature of the vapor phase of the material. In this condition, the specific volume of the fluid flowing through tube 7 is substantially identical to the specific volume of the fluid flowing through tube 17. When the tube 7, its fluid restricting device 15 and its control nozzle 11 are similar to the tube 17, its fluid restricting device 21 and its control nozzle 19, equal pressures are developed at control nozzles 19 and 11. This causes the flow of fluid from the power nozzle 25 of amplifier 13 to divide substantially equally between output passages 29 and 31 of the amplifier with the development of equal pressures at the input of the pressure drop transmitter 33. Thus, no substantial pressure difference is developed in the pressure drop transmitter 33. Even when the fluid restricting devices 15 and 21 or other corresponding parameters of the fluid circuits of tubes 7 and 17 are dissimilar and unequal pressures are developed in tubes 7 and 17 and ultimately in the input circuits of the pressure drop transmitter 33, the output reading of the pressure drop transmitter is calibrated to indicate a liquid level in the vessel 3 at or lower than the point where tube 7 passes through tube 5.

When the liquid rises up to and above the portion of tube 7 in tube 5, the liquid material, being cooler than its vapor because of heat loss from the submerged section of tube 5, heats the fluid in tube 7 from the supply source 9 less than the fluid therefrom in tube 17. The specific volume and the flow of the fluid in tube 7 is therefore greater than that in tube 17. This produces a higher fluid pressure in tube 7 than in tube 17 which causes control nozzle 11 in amplifier 13 to divert a greater portion of the fluid from the power nozzle 25 into the output passage 29 of the amplifier. The resulting increase in pressure in passage 29 compared to that in passage 31 is then detected and indicated in the pressure drop transmitter 33 directly in terms of liquid level in vessel 3. The temperature and pressure of the fluid passing through tube 7 varies in proportion to the depth of the liquid material above the portion of tube 7 in tube 5. Thus, the resulting pressure differential detected by the pressure drop transmitter 33 is proportional to and can be calibrated directly and accurately in terms of the level of the liquid in vessel 3.

A change in pressure in the vessel 3 produces a change in the temperature of the liquid surrounding the portion of tube 7 in tube 5. Such pressure change in vessel 3, however, produces a similar change in temperature of the vapor surrounding the portion of tube 17 in tube 5. Thus, the presence of tube 17 in the invention offsets potential liquid measurement errors caused by variations in the pressure of the material in vessel 3.

Though not shown in the drawing, alternate apparatus such as a fluidic Schmidt trigger device could be used in place of the fluidic amplifier in the practice of the invention. A fluidic Schmidt trigger device, which often consists of a plurality of series connected high gain fluidic amplifiers that provide a nearly square wave output signal between two predetermined discrete pressures, could be arranged such that when the pressure difference of the control input on conduits 35 and 37 differ, a preselected amount of a liquid level reading or a control signal for operation of external apparatus is obtained. A plurality of Schmidt trigger devices could also be provided, each of the same being sensitive to a different pressure differential to provide many separate discrete signals for an indication of liquid level location or for energizing external apparatus at predetermined liquid levels.

Obviously, many modifications and variations of the present invention are possible in the light of the above teachings. It is therefore to be understood that within the scope of the appended claims, the invention may be practiced otherwise than as specifically described.

What is claimed is:

1. Apparatus for indicating liquid level of a material in a heated pressurized vessel having a liquid and vapor phase, said apparatus comprising:
   a. a first tube that interconnects the liquid and vapor phases of the material in the vessel;
   b. a fluid source supplying a fluid at constant pressure;
   c. a second tube, a portion of which passes through a portion of he first tube that communicates with the vaporous phase of the material;
   d. a third tube, a portion of which passes through a portion of the first tube that normally communicates with the liquid phase of the material;
   e. means connecting the fluid source to one end of the second and third tubes for supplying fluid to the second and third tubes to enable the second and third tubes to regulate the fluid flow through said second and third tubes;
   f. detecting means connected to the other ends of the second and third tubes for detecting and amplifying differences in pressure in the second and third tubes caused by variations in level of the liquid phase of the first tube;
   g. and means for converting changes in pressure in the detecting means to a vessel liquid level reading.

2. Apparatus substantially as described in claim 1 wherein fluid restricting devices are positioned in the portions of the second and third tubes that pass through the first tube.

3. Apparatus substantially as described in claim 1 wherein the means for detecting and amplifying differences in pressure in the second and third tubes includes an analog fluidic amplifier.

4. Apparatus substantially as described in claim 3 wherein the output of the fluidic amplifier is connected to a pressure drop transmitter.

5. A liquid level measuring system comprising:
   a material having liquid and vapor phases;
   a pressurized vessel a first tube; first tube, connected to said vessel and said first tube containing said material;
   a fluid source supplying a fluid at constant pressure;
   a second tube having a first and second end with said first end of said second tube connected to said fluid source and having a portion of said second tube passing through a portion of said first tube that communicates with the vaporous phase of said material for regulating said fluid flow therethrough;
   a third tube having a first and second end with said first end of said third tube connected to said fluid source and having a portion of said third tube that normally communicates with the liquid phase of said material for regulating said fluid flow therethrough;
   detecting means connected to said second ends of said second and third tubes for detecting and amplifying the differential pressure of the fluids at said second ends of said second and third tubes and providing an output indicative of the difference in pressure between the fluids at said second ends of said second and third tubes; and
   indicating means connected to said detecting means for converting the output of said detecting means into a measure of liquid level of said material in said vessel.

6. A liquid level measuring system according to claim 9 further comprising:
   fluid restricting devices positioned in said portion of each of said second and third tubes passing through said first tube.

7. A liquid level measuring system according to claim 6 wherein said detecting means comprises an analog fluidic amplifier.

8. A liquid level measuring system according to claim 7 wherein said indicating means comprises a pressure drop transmitter.

* * * * *